US009745508B2

(12) United States Patent
Kropf

(10) Patent No.: US 9,745,508 B2
(45) Date of Patent: Aug. 29, 2017

(54) PROPPANTS FOR SEQUESTERING A TARGET SPECIES AND METHODS OF SEQUESTERING A TARGET SPECIES IN A SUBTERRANEAN FORMATION

(71) Applicant: University of Pittsburgh—Of the Commonwealth System of Higher Education, Pittsburgh, PA (US)

(72) Inventor: Matthew M. Kropf, Bradford, PA (US)

(73) Assignee: University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 0 days.

(21) Appl. No.: 14/635,741

(22) Filed: Mar. 2, 2015

(65) Prior Publication Data

US 2015/0247083 A1    Sep. 3, 2015

Related U.S. Application Data

(60) Provisional application No. 61/946,464, filed on Feb. 28, 2014.

(51) Int. Cl.
  *C09K 8/80* (2006.01)
  *E21B 43/267* (2006.01)
  *E21B 41/00* (2006.01)

(52) U.S. Cl.
  CPC .......... *C09K 8/805* (2013.01); *E21B 41/0064* (2013.01); *E21B 43/267* (2013.01); *Y02C 10/14* (2013.01)

(58) Field of Classification Search
  CPC ..... C09K 8/805; C09K 8/80; E21B 41/00064; E21B 43/267
  USPC ............................................ 166/280.2, 380.1
  See application file for complete search history.

(56) References Cited

U.S. PATENT DOCUMENTS

| | | | |
|---|---|---|---|
| 3,030,215 A * | 4/1962 | Alford | C03B 19/107 174/110 F |
| 4,068,718 A | 1/1978 | Cooke, Jr. | |
| 4,252,193 A * | 2/1981 | Powers | C04B 14/24 106/676 |
| 7,521,389 B2 | 4/2009 | Shmotev | |
| 7,648,934 B2 | 1/2010 | Shmotev | |
| 2008/0070774 A1* | 3/2008 | Shmotev | C04B 33/1322 501/69 |

(Continued)

FOREIGN PATENT DOCUMENTS

EP      2049614 B1    6/2011

OTHER PUBLICATIONS

Lyle, D., "Proppants Open Production Pathways," E&P, Hart Energy Publishing, Houston, TX (2011), 1-6.

(Continued)

*Primary Examiner* — Doug Hutton, Jr.
*Assistant Examiner* — Silvana Runyan
(74) *Attorney, Agent, or Firm* — Bartony & Associates, LLC

(57) ABSTRACT

A method of hydraulic fracturing in a subterranean formation includes injecting a fluid including a proppant into the subterranean formation, wherein the proppant includes a material adapted to sequester at least one target species, and exposing or contacting at least one of the proppant or the material to/with the at least one target species either prior to injecting the proppant or subsequent to injecting the proppant.

11 Claims, 3 Drawing Sheets

(56) References Cited

U.S. PATENT DOCUMENTS

| | | | | |
|---|---|---|---|---|
| 2012/0067568 A1* | 3/2012 | Palmer | ................... | E21B 36/02 |
| | | | | 166/256 |
| 2012/0227967 A1* | 9/2012 | Shaikh | ................... | C09K 8/805 |
| | | | | 166/280.1 |
| 2013/0056204 A1* | 3/2013 | McDaniel | ................ | C09K 8/80 |
| | | | | 166/280.1 |

OTHER PUBLICATIONS

International standard ISO 13503 2 (API RP 19C).
Vreeburg, R-J. "Proppant Backproduction During Hydraulic Fracturing—A New Failure Mechanism for Resin-Coated Proppants". Journal of petroleum technology, 46, (Oct. 1, 1994), (10), 884-889.
Rickards, Allan "High Strength, Ultra-lightweight Proppant Lends New Dimensions to Hydraulic Fracturing Applications". SPE production & operations, 21 (2), (May 1, 2006), p. 1-14.
Hawkins, G. W. "Laboratory Study of Proppant-Pack Permeability Reduction Caused by Fracturing Fluids Concentrated during Closure". 1988, 787-800.

\* cited by examiner

PROPPANTS FOR SEQUESTERING A TARGET SPECIES AND METHODS OF SEQUESTERING A TARGET SPECIES IN A SUBTERRANEAN FORMATION

CROSS-REFERENCE TO RELATED APPLICATIONS

This application claims benefit of U.S. Provisional Patent Application Ser. No. 61/946,464, filed Feb. 28, 2014, the disclosure of which is incorporated herein by reference.

BACKGROUND

The following information is provided to assist the reader in understanding technologies disclosed below and the environment in which such technologies may typically be used. The terms used herein are not intended to be limited to any particular narrow interpretation unless clearly stated otherwise in this document. References set forth herein may facilitate understanding of the technologies or the background thereof. The disclosure of all references cited herein are incorporated by reference.

In general, a proppant is a solid material designed to maintain an induced hydraulic fracture open, either during or after a fracturing process. Proppants are added to fracking fluids which are injected into subterranean formations. Fracking fluids vary in composition depending on the type of fracturing. Proppants may, for example, include treated sand, man-made ceramic materials and/or polymers. Current trends in fracking proppant selection have shifted from the use of silica sand to the use of high strength ceramic particles for deep well completions operations. This trend is based primarily of the strength and size conformation of the proppant material.

SUMMARY

In one aspect, a method of hydraulic fracturing in a subterranean formation (to open a fracture therein) includes injecting a fluid including a proppant into the subterranean formation, wherein the proppant includes a material adapted to sequester at least one target species, and exposing or contacting at least one of the proppant or the material to/with the at least one target species either prior to injecting the proppant or subsequent to injecting the proppant. The at least one target species may, for example, be carbon dioxide, other gaseous species such as an acid gases, or one or more components or materials present in flow-back water. As used herein, the term "sequester" refers to capturing or fixing a species via interaction therewith (for example, via reaction, adsorption, capture, encapsulation etc.).

In a number of embodiment, the target species may for example be absorbed upon exposure of at least one of the proppant or the material to a fluid (including, a liquid or a gas). In a number of embodiments, at least one of the proppant or the material is exposed to, for example, emissions from a combustion system for a hydrocarbon to expose the proppant or the material to the at least one target species. In a number of embodiments, the fluid including the proppant is injected and the at least one target species is pumped into the fracture after injection of the fluid including the proppant to sequester the at least one target species within the fracture. The proppant or the material may, for example, be exposed to the at least one target species prior to injecting the fluid including the proppant and the fluid including the proppant is thereafter injected to sequester the at least one target species within the fracture.

The material may, for example, be at least 55% by weight of the proppant, at least 75% by weight of the proppant, at least 85% by weight of the proppant, or at least 95% by weight of the proppant. In a number of embodiments, the material may be approximately 100% by weight of the proppant. The material may, for example, be selected from the group consisting of sodium bicarbonates, calcium bicarbonates, olivine, dunite, pyroxene, magnesium silicate, ankerite, dawsonite, serpentine, calcium oxides, magnesium oxides, magnesite, siderite, and dolomite.

In a number of embodiments, the at least one of the proppant includes a bulk proppant core and a layer outside the core which includes the material adapted to sequester the at least one target species. The at least one proppant may further include a completions layer outside the layer including the material adapted to sequester the at least one target species. The completions layer may, for example, (at least temporarily) provide the functionalized proppant wither properties desirable for the completions routine and/or may protect the layer including the material adapted to sequester the at least on target species during completions processes.

In another aspect, a method of sequestering at least one target species includes:
(i) exposing a proppant for use in subterranean hydrocarbon recovery via hydraulic fracturing which includes a material adapted to sequester the at least one target species at least one of (a) prior to injecting a fluid including the proppant into a subterranean fracture or (b) subsequent to injecting the fluid including the proppant into the subterranean fracture; or
(ii) exposing the material of the proppant to the at least one target species prior to completing formation of the proppant.

In a further aspect, a proppant is formed by incorporating a material in the proppant adapted to absorb/sequester at least one target species and exposing at least one of the material or the proppant including the material to the target species.

In still a further aspect, a proppant for use in hydraulic fracturing in a subterranean formation to prop a fracture therein includes a material adapted to sequester at least one target species.

The present devices, systems, methods and compositions, along with the attributes and attendant advantages thereof, will best be appreciated and understood in view of the following description taken in conjunction with any accompanying drawings.

DESCRIPTION

Figure 1:
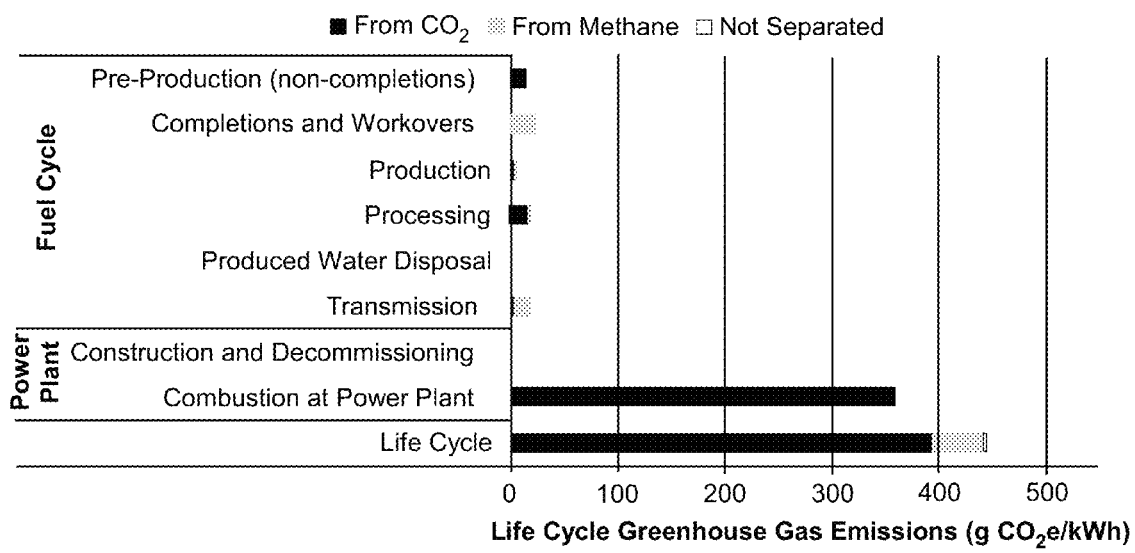
FIG. 1 illustrates a bar graph showing greenhouse gas emissions over the life cycle of natural gas production and combustion.

It will be readily understood that the components of the embodiments, as generally described herein and/or illustrated in the figures herein, may be arranged and designed in a wide variety of different configurations in addition to the described representative embodiments. Thus, the following description of representative embodiments or examples, is not intended to limit the scope of the embodiments, as claimed, but is merely representative of embodiments hereof.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As used herein and in the appended claims, the singular forms "a," "an", and "the" include plural references unless the context clearly dictates otherwise. Thus, for example, reference to "a material" includes a plurality of such materials and equivalents thereof known to those skilled in the art, and so forth, and reference to "the material" is a reference to one or more such materials and equivalents thereof known to those skilled in the art, and so forth. Recitation of ranges of values herein are merely intended to serve as a shorthand method of referring individually to each separate value falling within the range. Unless otherwise indicated herein, each separate value, as well as intermediate ranges of values, are incorporated into the specification as if individually recited herein. All methods described herein can be performed in any suitable order unless otherwise indicated herein or otherwise clearly contraindicated by the text.

In a number of embodiments hereof, proppant particles/materials are provided for use, for example, in hydraulic fracturing ("fracking") processes used for hydrocarbon recovery (for example, petroleum and natural gas recovery in shale formations). In that regard, a number of "functionalized" proppants hereof exhibit appropriate physiochemical properties for use in fracking procedures (for example, exhibit suitable strength and size for deep well completions) with one or more additional properties which can be utilized prior to fracking and/or in post-completions processes/routines. For example, one or more materials of the proppants hereof may absorb certain chemical/target species such as carbon dioxide ($CO_2$), hydrogen sulfide ($H_2S$), carbon monoxide (CO) and/or other chemical species so that chemical such species can be sequestered in subterranean formations under use of the proppant in fracking processes. In a number of embodiments hereof, the representative example of absorbing and sequestering carbon dioxide is set forth.

In several such representative embodiments, a carbon dioxide absorbing or sequestering material is used in proppants hereof so that the proppant can be used to effect carbon dioxide absorption/sequestration. Examples of carbon dioxide-absorbing materials suitable for use herein include, but are not limited to, sodium bicarbonates, calcium bicarbonates, olivine, dunite, pyroxene, magnesium silicate, ankerite, dawsonite, serpentine, calcium oxides, magnesium oxides, magnesite, siderite, dolomite, and/or other similar carbon-adsorbing materials and minerals. The carbon dioxide absorbing or sequestering material hereof may, for example, make up (by weight) at least 55%, at least 65%, at least 75%, at least 85%, at least 95% or 100% of the proppant. The proppants hereof may, for example, be manufactured directly from the materials/minerals through, for example, grinding to achieve appropriate size and shape distributions, or the proppants may be manufactured from the materials/minerals and derivatives thereof into, for example, a composite system (for example, a ceramic) with composite properties. Processing of the materials/minerals in forming proppants should not, however, substantially limit the ability of the materials to absorb/sequester $CO_2$ (and/or other target species to be absorbed/sequestered) in the formed proppant in embodiments in which the formed proppant is to absorb/sequester $CO_2$. A number of desirable properties of proppants are set forth in the international standard ISO 13503-2 (API RP 19C) (the disclosure of which is incorporated herein by reference). A number of such properties are set forth in Table 1 below to provide guidance in selecting carbon-absorbing/sequestering materials for use in proppants hereof. Table 1 also sets forth data for a minimally processed dunite sample.

Smaller proppants may spread farther into fractures and provide superior conductivity. However, crush resistance is important to prevent crushing of the proppants into very small particles or "fines" which may lead to decreased conductivity. In general, spherical proppants handle higher stresses and resist crushing better than non-spherical proppants. Proppants should be transportable into fractures and fissures, be compatible with fracturing and wellbore fluids, allow acceptable cleanup of fracturing fluids and resist flowback. Other desirable properties of proppants include thermal stability, chemical stability, environmental safety and ready availability. In addition to predetermining desirable properties for fracturing proppants, the performance of proppants may also be studied under realistic conditions to, for example, measure conductivity and other characteristics under conditions that may be unique to a particular reservoir. Proppant characteristics and engineering of proppants is, for example, discussed in Lyle, D., "Proppants Open Production Pathways," E&P, Hart Energy Publishing, Houston, Tex. (2011), the disclosure of which is incorporated herein by reference.

In a number of embodiments, a producing well in which the proppants hereof are used in a fracking fluid may feed methane and/or other hydrocarbon(s) to one or more combustion systems. Subsequently, emissions (or a portion/fraction thereof) from the combustions system may be pumped into or "cycled back" to the well/fracture to effect permanent sequestration of at least one target species in the emissions via interaction with the proppants hereof. The adsorption of the at least one target species of the combustion emissions by the proppants hereof may, for example, result in proppant hardening and/or swelling, which can further enhance recovery from the producing formation.

Alternatively, the materials/minerals of the proppants hereof or the manufactured proppants can be exposed to combustion emissions (or a portion/fraction thereof) prior to inclusion of the proppants in a fracking fluid so that such at least one target species from the emissions is sequestered upon use of the proppants. One or more chemically interactive or reactive species may, for example, be applied to or immobilized on proppants hereof to enhance hydrocarbon recovery, enhance emission sequestration, or to otherwise interact with recovery/production fluids.

TABLE 1

| Property | ISO 13503-2 Standard | Dunite |
|---|---|---|
| Turbidity (NTU) | ≤250 | 243 |
| Krumbein Shape Factors | | |
| Roundness | ≥0.6 | 0.5 |
| Sphericity | ≥0.6 | 0.5 |
| Clusters (%) | ≤1.0 | 0 |
| Bulk Density (g/cc) | | 1.33 |
| Bulk Density (lb/ft$^3$) | | 83.22 |
| Specific Gravity | | 2.62 |

| Particle Size Distribution, mm | Sieve | | |
|---|---|---|---|
| 1.180 | 16 | ≤0.1 | 0.1 |
| 0.850 | 20 | | 35.5 |
| 0.710 | 25 | | 30.6 |
| 0.600 | 30 | | 22.3 |
| 0.500 | 35 | | 9.8 |
| 0.425 | 40 | | 1.0 |
| 0.300 | 50 | | 0.1 |
| <0.300 | Pan | ≤1.0 | 0.6 |
| Total | | | 100.0 |
| % In Size | | ≥90 | 63.7 |

| | | |
|---|---|---|
| Mean Particle Diameter, mm | | 0.773 |
| Median Particle Diameter (MPD), mm | | 0.751 |
| Solubility in 12/3 HCL/HF for 0.5 HR @ 150° F. (% Weight Loss) | ≤2.0 | 33.8 |
| Settling Rate (ft/min) | | 93.9 |
| Crush Properties | | |
| ISO Crush Analysis (% Fines) 4 lb/ft2@ 2,000 psi | ≤10 | 15.8 |

A number of benefits are provided by using the proppants hereof in modern fracking procedures (for example, in hydraulically fractured shale formations). The functionality of the proppant may, for example, be made to enhance production from the formation during or after completions routines. Moreover, the functionalized proppants hereof may also, and in some cases concurrently, react with or otherwise fix/sequester unwanted byproducts associated with the production or use of recovered hydrocarbons (such as combustion emissions and contaminated flow-back water) to permanently fix such byproducts within the producing formation. Such benefits may increase well production, enhance profitability and/or reduce waste impact of hydraulically fractured reservoirs (for example, shale oil and/or gas reservoirs).

Materials in flow-back water which may be fixed/sequestered by functionalized proppants hereof include, but are not limited to, clays, chemical additives, dissolved metal ions, total suspended particles (TSP), total dissolved solids (TDS), and radioactive materials. TDS may, for example, include sodium, magnesium, potassium, and other salts as well as minerals including but not limited to barium, calcium, and iron. TSP may, for example, include clay, minerals, and other colloidal particles. Dissolved metal ions may, for example, include copper, iron, lead, cobalt, and chromium. Chemical additives may, for example, include gelling agents, scale inhibitors, breakers, crosslinkers, biocides, corrosion inhibitors, acids, friction reducers, surfactants, and salts. Radioactive materials (in the case of produced water) may, for example, include radium isotopes.

Functional materials for inclusion into proppants for interaction with material in flow-back water may, for example, include proteins, enzymes, bentonite, activated carbon, chitin, acids, bases, synthetic polymer and natural polymers. The properties required of such functional materials may vary with the intended purpose. Functional proppants for interaction with flow-back water may, for example, form a filter-like super-structure of packed functionalized proppants, where the property is achieved by either proppant placement and/or proppant materials encouraging or facilitating binding under packing conditions.

The use of the functionalized fracking proppant technology hereof represents a paradigm shift in the progression of engineered fracking proppants. Currently available advanced engineered proppants are optimized for only primary production productivity, while the functionalized proppants hereof offer, for example, preproduction, secondary production and/or post completions functionality. In that regard, the functionalized fracking proppants hereof not only improve or maximize well productivity through controlled shape and hardness, but are also chemically designed for preproduction, secondary production and/or post completions functionality.

FIG. 1 illustrates a study of greenhouse gas emissions over the life-cycle of the production and combustion of natural gas from a fracking operation. As seen from FIG. 1, the majority of greenhouse gas emissions arise from $CO_2$ emitted during the combustions cycle. Although natural gas is one of the cleanest fuels for the efficient production of electricity, the life cycle greenhouse gas emissions associated therewith are higher than a number of alternative energy options such as solar power, wind power and nuclear power.

Figure 2:
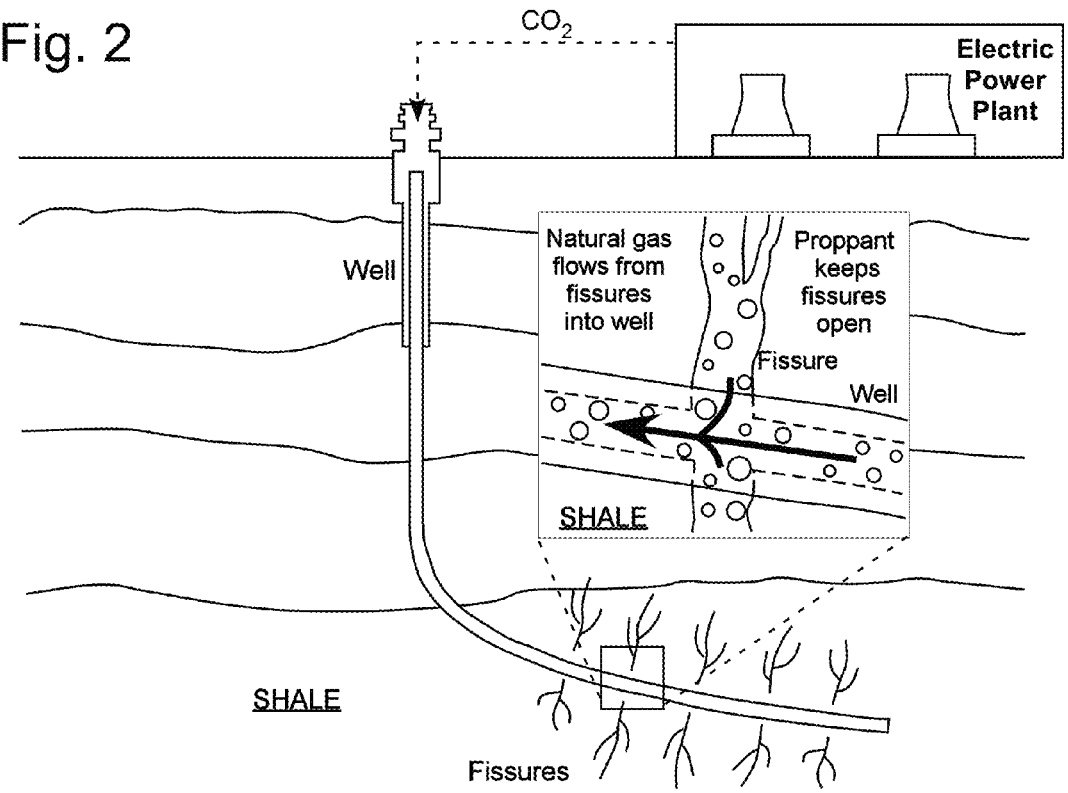
FIG. 2 illustrates schematically a hydraulically fractured well for the production of, for example, natural gas and the pumping of combustion emissions from an electric power plant into the well for the sequestration of, for example, carbon dioxide in a functionalized proppant.
Figure 3A:
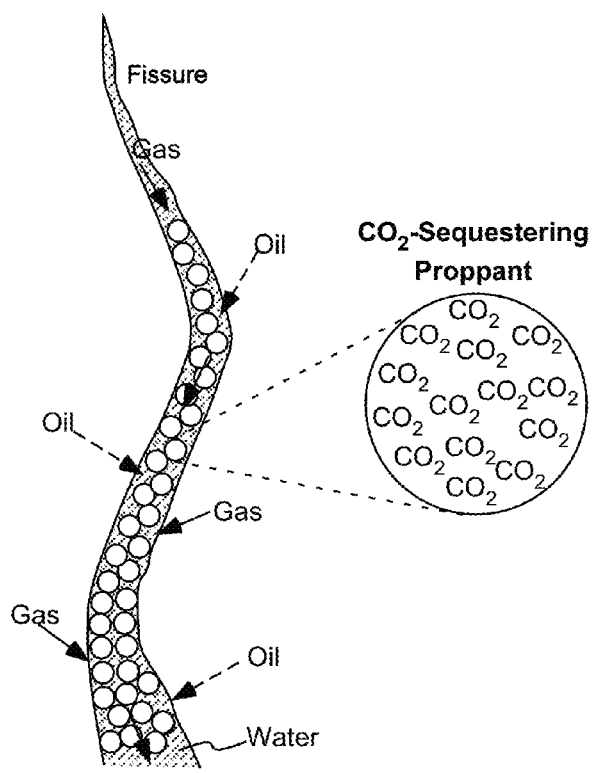
FIG. 3A illustrates the use of a functionalized proppant to prop a hydraulically fractured fissure and the sequestration of carbon dioxide in the functionalized proppant.
Figure 3B:
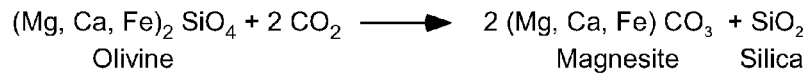
FIG. 3B illustrates chemical reactions via which carbon dioxide may be sequestered using the mineral olivine or the mineral serpentine.
Figure 3B:

FIGS. 2 and 3A schematically illustrate the fracking process and the use of functionalized fracking proppants hereof to sequester, for example, $CO_2$ from an electric power plant within hydraulic fractured strata. In hydraulic fracturing or fracking, a high-pressure fluid is injected into a wellbore to create cracks, fractures or fissures in the deep-rock formations through which natural gas, petroleum, and brine will flow more freely. After the hydraulic pressure is removed from the well, small grains of hydraulic fracturing proppants hold the fissures open (see, for example, FIG. 3A). As illustrated in FIG. 2, natural gas turbine exhaust from an electric power plant can be cycled back into a completed hydraulic fracking reservoir. As illustrated in FIG. 3A, the proppant carbonized, altering physical properties thereof, which may potentially benefit secondary production from the well. FIG. 3B illustrates chemical reactions of the representative examples of olivine and serpentine that demonstrate how the functionalized proppants hereof are carbonized. By sequestering $CO_2$ from the electric power plant via carbonization of the functionalized proppants hereof, the electricity produced from the electric power plant has lower effective carbon emissions.

Figure 4:
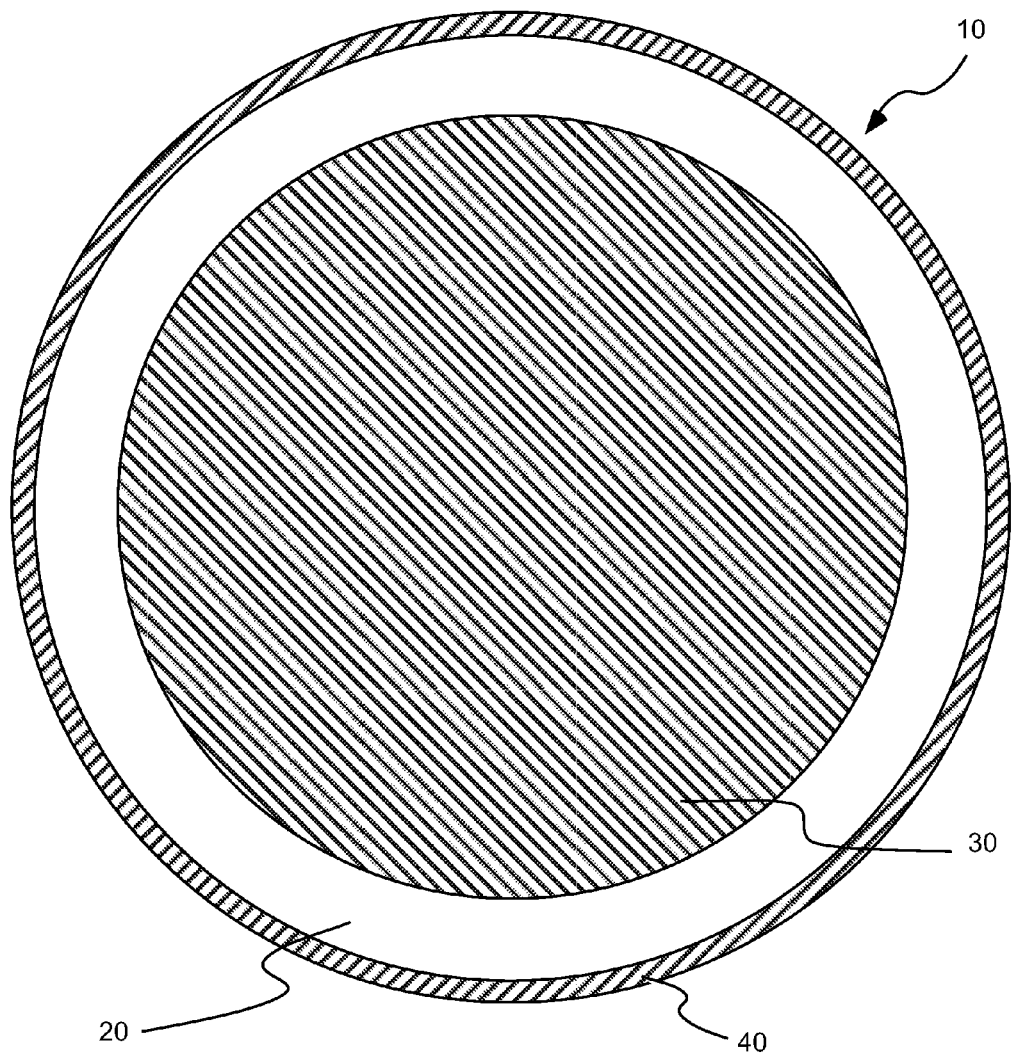
FIG. 4 illustrates an embodiment of an engineered or composite proppant including a layer of functionalized material.

As seen from Table 1, various materials such as dunite used in functionalize fracking proppants hereof may not possess physical characteristics that are optimized for use as fracking proppants. In a number of embodiments, such minerals or materials may be incorporated into an engineered fracking proppant using engineering principles developed in the fracking proppant arts to improve or optimize properties desirable for fracking proppants such as sphericity and hardness/crushing resistance. FIG. 4 illustrates a representative example of an engineered proppant 10 hereof incorporating a functional or functionalized material layer 20 (for example, functional to sequester a species such as $CO_2$, provide flow-back water treatment and/or enhance secondary recovery), a bulk proppant material core 30 and an outer completions layer 40. Completions layer or surface 40 provides functionality for well completion and may provide chemical isolation of functional material layer 20. Bulk proppant material core 30 may, for example, provide bulk material properties desirable for completions processes, including, for example, mechanical properties/strength and conformation/shape. Bulk proppant material core 30 may, for example, be a silica sand or a sintered or ceramic material as known in the fracturing proppant arts. Completions layer 40 may, for example, be a polymeric or resin layer as known in the fracturing proppant arts.

Completions layer 40 may, for example, include or be formed of a permeable, removable, or degrading material that, at least temporarily provides the functionalized proppant wither properties desirable for the completions routine. For example, completions layer 40 of functionalized proppant 10 hereof may contain or form a coating that is not dissolvable in an acidic environment (for example, within HCl) which prevents the functionalized surface, or remaining subsurface (for example dunite, etc.) from dissolving in acidic completions fluids. Completions layer 40 may, for example, later be removed via, for example, flushing a chemical additive subsequent to the completions routine, degrade naturally, or be designed to be permeable to the sequestered species (for example, $CO_2$). Once again, completions layer 40 may include resins and polymers. An engineered proppant such as proppant 10 may, for example, be manufactured using applied engineering principles via sintering, application of coatings, drying, and physical compaction.

The foregoing description and accompanying drawings set forth a number of representative embodiments at the present time. Various modifications, additions and alternative designs will, of course, become apparent to those skilled in the art in light of the foregoing teachings without departing from the scope hereof, which is indicated by the following claims rather than by the foregoing description. All changes and variations that fall within the meaning and range of equivalency of the claims are to be embraced within their scope.

What is claimed is:

1. A method of hydraulic fracturing in a subterranean formation, comprising:
   injecting a fluid comprising a proppant into the subterranean formation to sequester at least one target species within the subterranean formation via sequestration within the proppant, the proppant comprising a material adapted to sequester the at least one target species, which is formed external to the subterranean formation and formed external to the proppant and the material; and
   exposing the material to the at least one target species to sequester the at least one target species within the material prior to injecting the proppant.

2. The method of claim 1 wherein the at least one target species is carbon dioxide.

3. The method of claim 2 wherein the material is exposed to emissions from a combustion system including the at least one target species.

4. The method of claim 1 wherein at least one of the proppant or the material is exposed to the at least one target species prior to injecting the fluid comprising the proppant, and the fluid comprising the proppant is thereafter injected to sequester the at least one target species within the subterranean formation.

5. The method of claim 1 wherein the material is selected from the group consisting of dunite.

6. The method of claim 2 wherein the material is selected from the group consisting of dunite.

7. The method of claim 1 wherein the material comprises at least 55% by weight of the proppant.

8. The method of claim 1 wherein the at least one of the proppant comprises a bulk proppant core and a layer outside the bulk proppant core comprising the material adapted to sequester the at least one target species.

9. The method of claim 8 wherein the at least one proppant further comprises a completions layer outside the layer comprising the material adapted to sequester the at least one target species, the completions layer providing protection to the layer comprising the material adapted to sequester the at least on target species during completions processes.

10. The method of claim 1 wherein the at least one target species is formed in a combustion emission process.

11. The method of claim 1 wherein the material is exposed to the at least one target species prior to completing formation of the proppant.

* * * * *

UNITED STATES PATENT AND TRADEMARK OFFICE
CERTIFICATE OF CORRECTION

| | | |
|---|---|---|
| PATENT NO. | : 9,745,508 B2 | Page 1 of 1 |
| APPLICATION NO. | : 14/635741 | |
| DATED | : August 29, 2017 | |
| INVENTOR(S) | : Matthew M. Kropf | |

It is certified that error appears in the above-identified patent and that said Letters Patent is hereby corrected as shown below:

In the Claims

Column 8, Claim 9, Line 41 delete "on" and insert --one--

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*